United States Patent [19]
Smith et al.

[11] Patent Number: 5,920,410
[45] Date of Patent: Jul. 6, 1999

[54] ACCESS NETWORK

[75] Inventors: Philip John Smith; David Wynford Faulkner, both of Ipswich, United Kingdom

[73] Assignee: British Telecommunications public limited company, London, United Kingdom

[21] Appl. No.: 08/737,641
[22] PCT Filed: Jun. 6, 1995
[86] PCT No.: PCT/GB95/01298

§ 371 Date: Dec. 18, 1996

§ 102(e) Date: Dec. 18, 1996

[87] PCT Pub. No.: WO95/34182

PCT Pub. Date: Dec. 14, 1995

[30] Foreign Application Priority Data

Jun. 8, 1994 [EP] European Pat. Off. .............. 94304139

[51] Int. Cl.[6] .......................... H04B 10/20; H04B 14/00
[52] U.S. Cl. ............................................ 359/119; 359/110
[58] Field of Search ........................... 359/118–119, 125, 359/128, 137, 139, 110; 370/424, 460

[56] References Cited

U.S. PATENT DOCUMENTS 5,615,036  3/1997  Emura ...................................... 359/124

FOREIGN PATENT DOCUMENTS

A 0249056  12/1987  European Pat. Off. .
A 93 12624  6/1993  WIPO .

OTHER PUBLICATIONS

Abiven et al, "Molene:Systeme de Distribution d'acces a 2Mbit/s sur reseau optique passif", Commutation et Transmission, vol. 14, No. 4, 1992, Paris, Fr, pp. 27–34, XP328635.

Lecroq, "Satflex 2:equipements pour reseaux optiques flexibles", Commutation et Transmission, vol. 15, No. 1, 1993, Paris, Fr, pp. 11–18, XP345516.

Berlinet, "Researux optiques flexibles", Commutation et Transmission, vol. 15, No. 1, 1993, Paris, Fr, pp. 5–10, XP345515.

Imai et al, "A Study on Subscriber Optical Line–Switching Networks", Electronics and Communications in Japan, vol. 74, No. 10, Oct. 1991, New York, US, pp. 25–36, XP303551.

Sankawa et al, "A Study on Subscriber Optical Fiber Switching Networks", Journal of Optical Communications, vol. 13, No. 4, Dec. 1992, Berlin De, pp. 150–155, XP278867.

*Primary Examiner*—Kinfe-Michael Negash
*Attorney, Agent, or Firm*—Nixon & Vanderhye P.C.

[57] ABSTRACT

A telecommunications access network includes a plurality of customer terminals and a plurality of network nodes. Each network node is connected to a plurality of the customer terminals by respective local access lines, whereby each customer terminal is connectable to a switch of a telecommunications core network via one of the network nodes. At least one of the customer terminals is connected to two of the network nodes by respective local access lines.

10 Claims, 3 Drawing Sheets

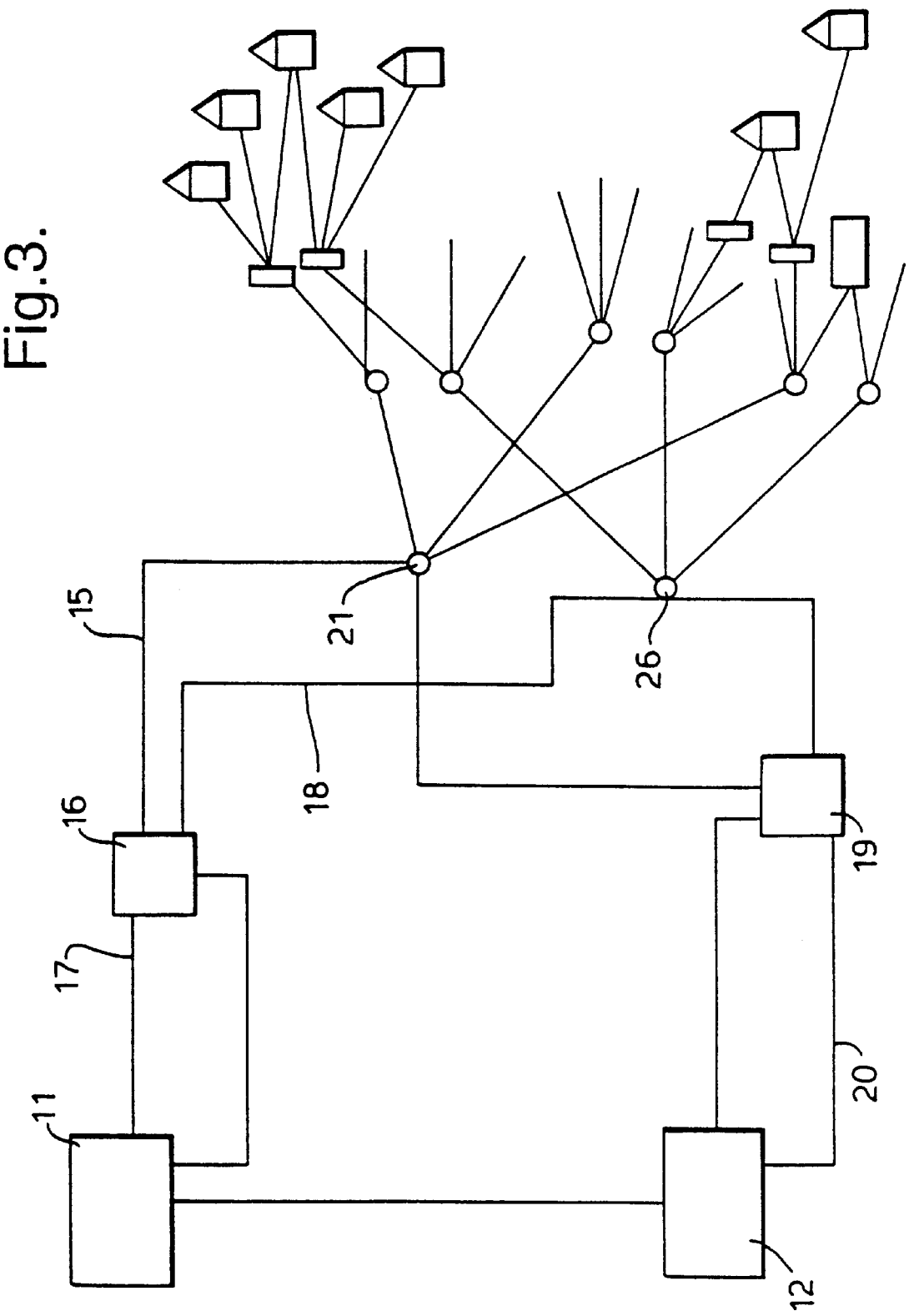

ACCESS NETWORK

BACKGROUND OF THE INVENTION

1. Field of the Invention

This invention relates to a telecommunications access network, and in particular to an optical fibre telecommunications access network.

2. Related Art

In the United Kingdom, the telecommunications network includes a trunk network which is substantially constituted by optical fibre, and a local access network which is substantially completely constituted by copper pairs. Flexibility in the copper access network is provided at two points en route to the customer; firstly, at street-side cabinets serving up to 600 lines; and secondly, at distribution points (DPs) serving around 10–15 lines. Eventually, it is expected that the entire network, including the access network, will be constituted by fibre.

The ultimate goal is a fixed, resilient, transparent telecommunications infrastructure for the optical access network, with capacity for all foreseeable service requirements. One way of achieving this would be to create a fully-managed fibre network in the form of a thin, widespread overlay for the whole access topography, as this would exploit the existing valuable access network infrastructure. Such a network could be equipped as needs arise, and thereby could result in capital expenditure savings, since the major part of the investment will be the provision of terminal equipment on a 'just in time' basis. It should also enable the rapid provision of extra lines to new or existing customers, and flexible provision or reconfiguration of telephony services.

In order to be future proof, the network should be single mode optical fibre, with no bandwidth limiting active electronics within the infrastructure. Passive optical networks (PONs) offer total transparency and freedom for upgrade.

The most common optical network is the simplex single star, with point-to-point fibre for each transmit and receive path, from the exchange head end (HE) to the customer network terminating equipment (NTE). This network design involves high fibre count cables, and unique electro-optic provision at HE and NTE for each customer. The resulting inherent cost can only be justified for large business users, who generally also require the security of diverse routing, which increases the cost still further.

The advent of optical splitters (power dividers) allows the power transmitted from a single transmitter to be distributed amongst several customers, thereby reducing and sharing the capital investment. In 1987, BT demonstrated this technology in a system for telephony on a passive optical network (TPON), with a 128-way split and using time division multiplex (TDM) running at 20 Mb/s. This combination enabled basic rate integrated service digital network (ISDN) to be provided to all customers. In practice, the competitive cost constraint of the existing copper network precludes domestic customers from having just telephony over fibre, due to the high capital cost of equipment. This may change in the future. In the meantime, telephony for small business users (for example those having more than 5 lines) can probably break this barrier.

The wider range of services and higher capacity required by business customers makes a 32-way split more attractive for a 20 Mb/s system, and this has been demonstrated by BT's local loop optical field trial (LLOFT) at Bishop's Stortford.

In summary, the use of splitter-based PON architecture will reduce the cost of fibre deployment in the access network. When compared with point-to-point fibre, savings will result from:

(i) reducing the number of fibres at the exchange and in the network;
(ii) reducing the amount of terminal equipment at the exchange;
(iii) sharing the cost of equipment amongst a number of customers;
(iv) providing a thin, widespread, low cost, fibre infrastructure; and
(v) providing a high degree of flexibility, and allowing 'just in-time' equipment and service provision.

Additionally, PON architecture can be tailored to suit the existing infrastructure resources (duct and other civil works).

Total network transparency will retain the option for future services to be provided on different wavelengths to the telecommunications, which for TPON is in the 1300 nm window. By transmitting at other wavelengths, other services, such as broadband access for cable television and high definition television, or business services, such as high bit rate data, video telephony or video conferencing, can be provided. The huge bandwidth potential of fibre promises virtually unlimited capacity for the transparent network. Eventually, it may be possible to transmit hundreds of wavelengths simultaneously, as the development of technology in optical components, such as narrow band lasers, wavelength division muitiplexers (WDMs), optical filters, fibre amplifiers and tuneable devices, moves forward.

For this potential to remain available, and for the access network to be used to provide many and varied services, then it must be designed and engineered to provide very high levels of security and resilience. Even for simple POTS (plain old telephony service), advance warning and live maintenance are essential to limit disruption.

A particularly important aspect of resilience is the reliability of the network, and this is particularly the case for business customers. Thus, even if a business customer has several lines, these will tend to come from the same DP, so that a failure between that DP and the upstream cabinet, or a failure between that cabinet and the exchange, or even a failure at the exchange itself will result in loss of service to that customer.

The problem of resilience is discussed in Commutation et Transmission, Vol. 14, No. 4, 1992, Paris, FR, pages 27–34, J. Abiven et al, MOLENE:systeme de distribution d'acces a 2 M bit/s sur reseau optique passif", and Commutation et Transmission, Vol. 15, No. 1, 1993, Paris, FR, pages 5–10, D. Berlinet et al: Researux optiques flexibles", wherein resilience is achieved with the provision of a dependent, duplicated backup network.

SUMMARY OF THE INVENTION

The present invention provides a telecommunications local access network including at least two independent subnetworks, wherein each of the independent subnetworks serves a respective group of user terminations in the same local area, and wherein each subnetwork includes transmission links connecting the respective group of user terminations to a respective switch of a telecommunications core network, wherein a plurality of user terminations are each served by at least a first and a second of the independent subnetworks so that telecommunications service(s) are routinely available thereto over both of the first and second subnetworks, with service(s) continuing to be provided from one of the first and second subnetworks in the event that the other of the first and second subnetworks fails.

In a preferred embodiment, each independent subnetwork further includes network nodes, wherein each respective group of user terminations are connected to each respective switch with transmission links via respective network nodes.

Thus, if one of the transmission links (or one of the associated network nodes) of said at least one user termination fails, that user can still receive service via its other transmission link, thereby providing that user with resilience, In a preferred embodiment, the network nodes are configured at first level nodes associated with a switch and second level nodes, each first level network node being connected to a plurality of the second level network nodes by respective transmission links. Advantageously, said at least one user termination may be connected to two second level network nodes. Alternatively, said at least one user termination may be connected to two first level network nodes. Thus, customers can be provided with resilience at either the DP (second level of network nodes) level, or at the cabinet (first level of network nodes) level. In either case, resilience is provided at all network node levels downstream of the core network switch.

Preferably, each of said independent subnetworks is connected to a different switch of the core network. In this way, further resilience is provided in that users provided with resilience can still receive service even if one of the switches fails.

Connection to the first level of network nodes may be provided by a ring of transmission links, Conveniently, each of said rings may be connected to its respective switch via a respective concentrator and a further ring.

Advantageously, the transmission links are constituted by optical fibres. In this case, each of said independent subnetworks may constitute a PON.

BRIEF DESCRIPTION OF THE DRAWINGS

The invention will now be described in greater detail, by way of example, with reference to the accompanying drawings, in which:

FIG. 3 is a schematic representation of a second form of telecommunications network embodying the invention.

DETAILED DESCRIPTION OF EXEMPLARY EMBODIMENTS

Figure 1:
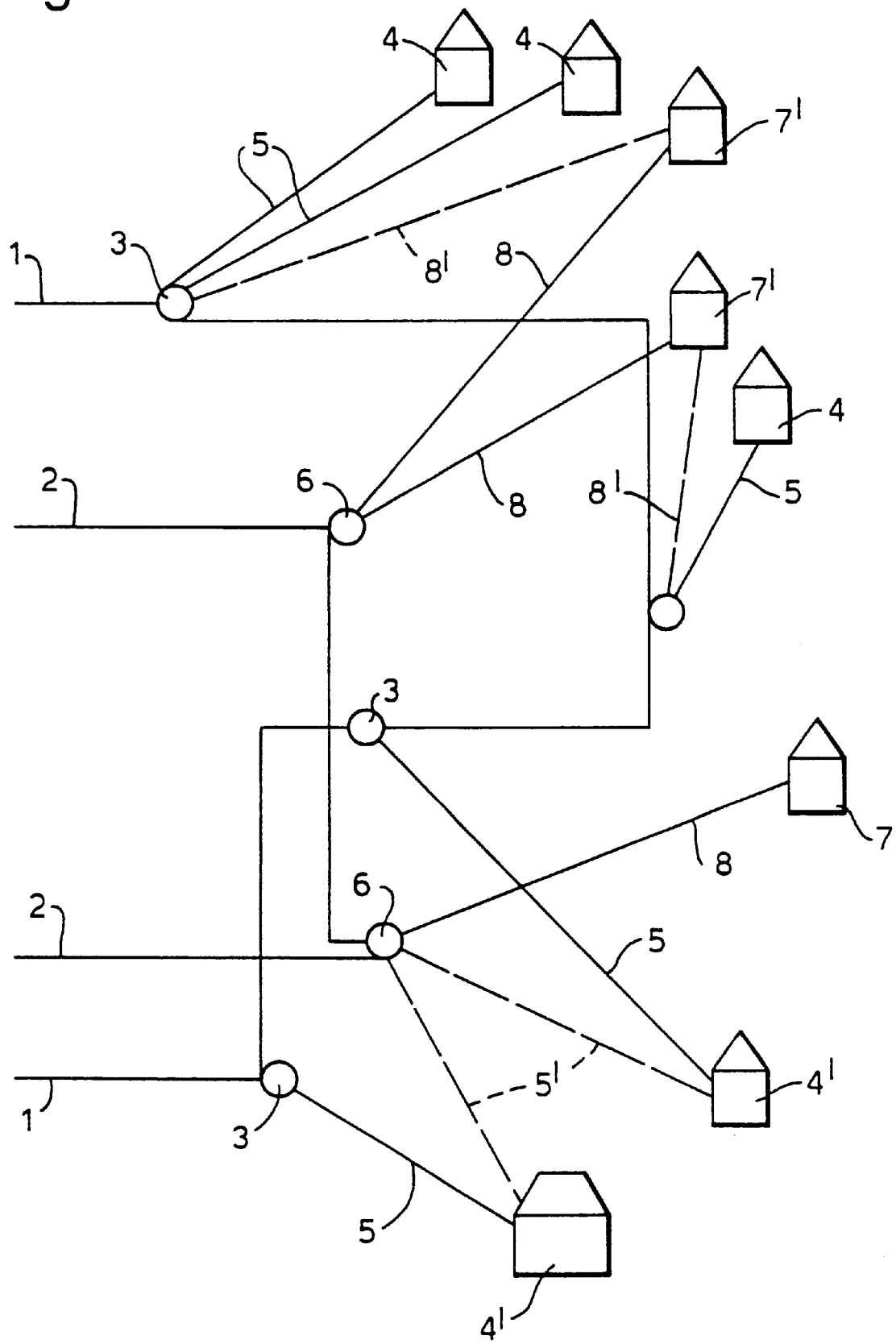
FIG. 1 is a schematic representation of a telecommunications network which illustrates the principle of the invention.

Referring to the drawings, FIG. 1 is a schematic representation of a telecommunications access network having first and second fibre rings 1 and 2, each of which is centred on a local exchange (not shown). The ring 1 is provided with a plurality of nodes 3, each of which is connected to a plurality of customer premises 4 by respective optical fibres 5. Similarly, the ring 2 is provided with a plurality of nodes 6, each of which is connected to a plurality of customer premises 7 by respective optical fibres 8. Each of the nodes 3 and 6 is constituted by a passive optical splitter, so that these nodes can be considered as DPs.

In order to provide resilience, some of the customer premises of the ring 1 (identified by the reference numerals 4') are connected to nearby nodes 6 of the ring 2 by respective optical fibres 5'. Similarly, some of the customer premises of the ring 2 (identified by the reference numerals 7') are connected to nearby nodes 3 of the ring 1 by respective optical fibres 8'. The optical fibres 5 and 8 are termed "main" fibres, and the optical fibres 5' and 8' are termed "standby" fibres. The customer premises 4' and 7' are, therefore, each connected to both rings 1 and 2, thereby ensuring that those premises receive service if their main fibres 5 and 8 fail, or if either of the rings 1 and 2 fails, or if either of the associated nodes 3 and 6 fails. If further resilience is required, the two rings 1 and 2 would be centred on different local exchanges, thereby protecting customers opting for resilience against exchange failure as well as against fibre failure.

Figure 2:
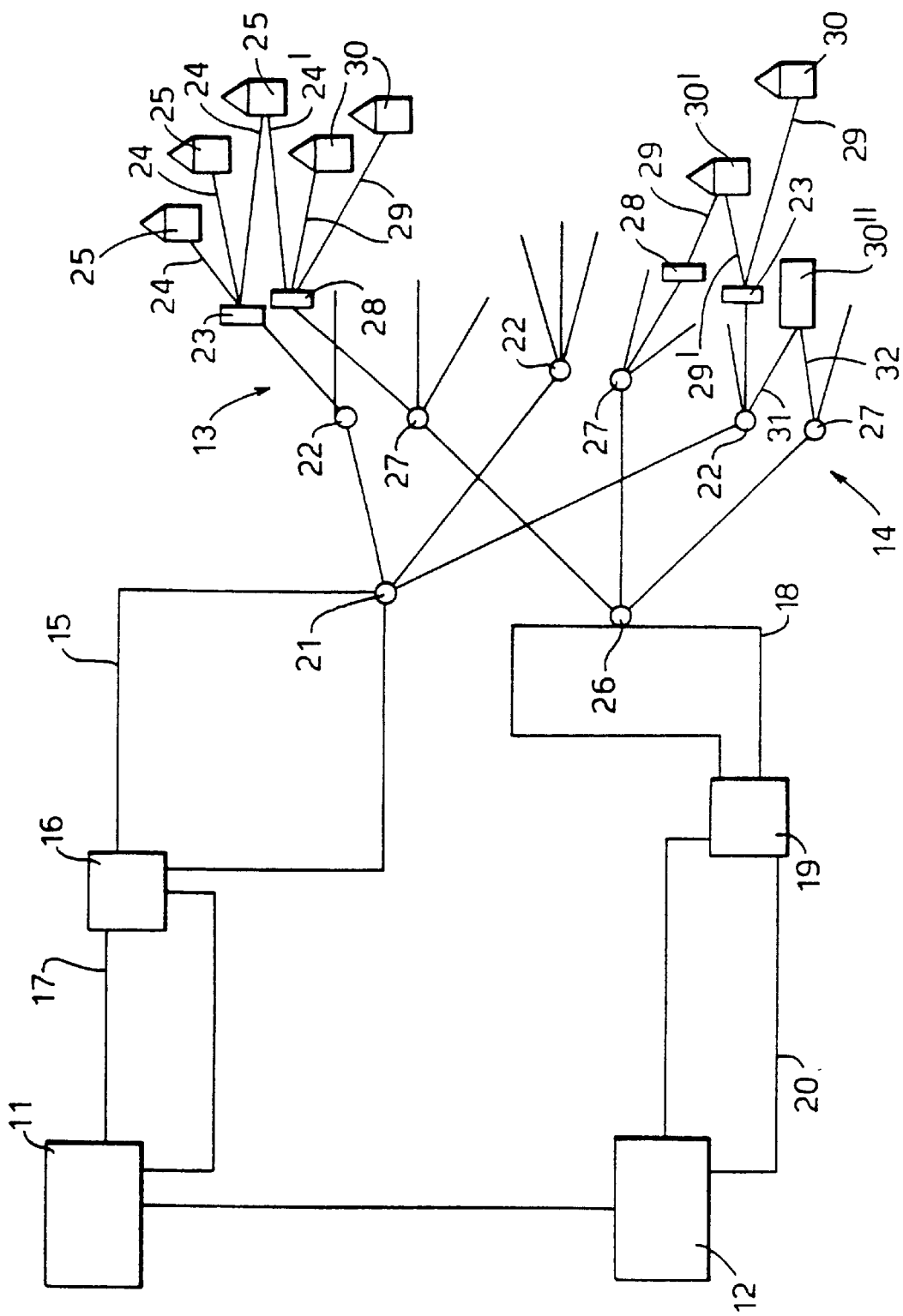
FIG. 2 is a schematic representation of a first form of telecommunications network embodying the invention.

FIG. 2 shows a practical realisation of the invention which embodies the principle of interleaved PONs. The access network of FIG. 2 includes two adjacent digital local exchanges (DLEs) 11 and 12 associated respectively with PONs 13 and 14. The PON 13 is connected to the DLE 11 via a fibre ring 15, a concentrator 16, and a synchronous digital hierarchy (SDH) fibre ring 17. Similarly, the PON 14 is connected to the DLE 12 via a fibre ring 18, a concentrator 19, and an SDH ring 20.

The PON 13 has three levels of split, including a first splitter 21 associated with the ring 15, and having a 2×4-way split. The second level of split is constituted by four splitters 22, each having a 4-way split. The third level of split is constituted by sixteen splitters 23, each having a 16-way split. The splitters 23 can be considered as DPs. Respective optical fibres 24 lead from each of the splitters 23 to associated customer premises 25. For reasons of clarity, not all the splitters 22, 23 and 24 and the associated fibres and customer premises are shown in FIG. 2.

Similarly, the PON 14 has three levels of split, including a first splitter 26 associated with the ring 18 and having a 2×4-way split. The second level of split is constituted by four splitters 27, each having a 16-way split. The third level of split is constituted by sixteen splitters 28, each having a 16-way split. The splitters 28 can be considered as DPs. Respective optical fibres 29 lead from each of the splitters 28 to associated customer premises 30. For reasons of clarity, not all the splitters 26, 27 and 28 and the associated fibres and customer premises are shown in FIG. 2.

In order to provide resilience, some of the customer premises of the ring 15 (identified by the reference numerals 25') are connected to nearby splitters 28 of the ring 18 by respective optical fibres 24'. Similarly, some of the customer premises of the ring 18 (identified by the reference numerals 30') are connected to nearby splitters of the ring 15 by respective optical fibres 29'. The customer premises 25' and 30' are, therefore, each connected to both the rings 15 and 18, thereby ensuring that those premises receive service if their main fibres 24 and 29 fail, or if any of the rings 15, 17, 18 and 20 fails, or if any associated interconnecting node (splitter) 21, 22, 23, 26, 27 or 28 fails. As the rings 15 and 18 are centred on different DLEs 11 and 12, the customers opting for resilience are also protected against exchange failure as well as against fibre or node failure.

The embodiment of FIG. 2 also shows a further form of resilience, in that a customer premises 30" (which may be, for example, the premises of a large business customer) is connected directly to adjacent splitters 22 and 27 of the two PONs 13 and 14 by respective fibres 31 and 32.

FIG. 3 shows a second form of access network embodying the principle of interleaved PONs. The network of FIG. 3 is very similar to that of FIG. 2, and so like reference numerals are used for similar parts, and only the modifications will be described in detail. The main modification shown in FIG. 3 is that each of the rings 15 and 18 is associated with both the concentrators 16 and 19, so that each of the PONs 13 and 14 is connected to each of the DLEs 11 and 12. This gives additional resilience to customers not connected to splitters 23 and 28 of the two rings 15 and 18. This network has the further advantage of providing additional resilience to customers connected to splitters 23 and 28 of the two rings 15 and 18 in that protection is provided against two failures in the network, as alternative routes round faults are available.

The interleaved PONs of the networks of FIGS. 2 and 3 ensure that the DPs (that is to say the splitters 23 and 28) are fed alternately to the DLEs 11 and 12. Customers who require a highly resilient service could pick up connections from both the DLEs 11 and 12, thereby providing such customers with separate routes to the two DLEs. Consequently, there is no duplication of any hardware, apart from the final drop from the DPs to the customers. In the event of any DLE, concentrator or link failure, another connection route is always available.

It should be noted that, in each of the embodiments described above, only those customers who require resilience would be supplied with both main and standby fibres. Moreover, in principle, there is no distinction between main and standby fibres, so that customers opting for resilience could choose to operate using a main and standby approach, or could split their traffic between the two connections.

It should be apparent that modifications could be made to the networks described above. In particular, the principle of the invention could be incorporated into local access network arrangements utilising copper pairs as the local access lines. In this case, customers requiring resilience would be connected to the DPs of two local access networks centred on different local exchanges by separate copper pairs. It would also be possible to use the principle of the invention in local access networks having radio transmitters providing the final drop to customers. In this case, customers requiring resilience would be provided with two narrow angle transmitters, each of which would be directed towards respective nearby DPs of two local access networks centred on different local exchanges.

What is claims is:

1. A telecommunications local access network comprising:

at least two independent subnetworks each of said independent subnetworks being connected to serve respective group of user terminations in the same local area, and each subnetwork including transmission links connecting its respective group of user terminations to a respective switch of a telecommunications core network, a plurality of user terminations each being served by at least a first and a second of said independent subnetworks so that telecommunications service(s) are routinely available thereto over both of said first and second subnetworks, with services continuing to be provided from one of said first and second subnetworks in the event that the other of said first and second subnetworks fails.

2. A network as in claim 1, wherein:

the network nodes are configured as first level nodes associated with a switch and as second level nodes, each first level network node being connected to a plurality of the second level network nodes by respective transmission links.

3. A network as in claim 2, wherein:

connection to the first level nodes is provided by a ring of transmission links associated with a respective switch.

4. A network as in claim 3, wherein:

each ring of transmission links is connected to its respective switch via a respective concentrator and a further ring of transmission links.

5. A network as in claim 2 wherein: said at least one user termination is connected to two second level network nodes.

6. A network as in claim 2 wherein:

said at least one user termination is connected to two first level network nodes.

7. A network as in claim 1 wherein:

each said subnetwork is connected to a different switch of the core network.

8. A network as in claim 1 wherein:

said transmission links are constituted by optical fibres.

9. A network as claimed in claim 8 wherein:

each said subnetwork is a passive optical network.

10. A network as in claim 1 wherein each independent subnetwork further comprises:

network nodes; and wherein each respective group of user terminations are connected to each respective switch with transmission links via respective network nodes.

* * * * *